(12) United States Patent
Geese et al.

(10) Patent No.: US 11,252,388 B2
(45) Date of Patent: Feb. 15, 2022

(54) METHOD AND DEVICE FOR PROCESSING AN IMAGE SIGNAL OF AN IMAGE SENSOR FOR A VEHICLE

(71) Applicant: Robert Bosch GmbH, Stuttgart (DE)

(72) Inventors: Marc Geese, Ostfildern Kemnat (DE); Ulrich Seger, Leonberg-Warmbronn (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 16/715,365

(22) Filed: Dec. 16, 2019

(65) Prior Publication Data

US 2020/0204773 A1 Jun. 25, 2020

(30) Foreign Application Priority Data

Dec. 19, 2018 (DE) .......................... 102018222260.6

(51) Int. Cl.
*H04N 9/67* (2006.01)
*G06T 1/00* (2006.01)

(52) U.S. Cl.
CPC .............. *H04N 9/67* (2013.01); *G06T 1/0007* (2013.01); *G06T 1/0014* (2013.01); *G06T 2207/10024* (2013.01); *G06T 2207/30236* (2013.01); *G06T 2207/30252* (2013.01)

(58) Field of Classification Search
CPC ...... H04N 9/67; H04N 9/04551; H04N 1/646; H04N 9/0451; H04N 9/04517; H04N 1/64; G06T 1/0007; G06T 1/0014; G06T 2207/10024; G06T 2207/30236; G06T 2207/30252

See application file for complete search history.

(56) References Cited

U.S. PATENT DOCUMENTS

| | | | |
|---|---|---|---|
| 2003/0227577 A1* | 12/2003 | Allen | H04N 9/73 348/742 |
| 2008/0158396 A1* | 7/2008 | Fainstain | H04N 5/361 348/246 |
| 2009/0268044 A1* | 10/2009 | Gill | H04N 1/62 348/222.1 |
| 2011/0292477 A1 | 12/2011 | Klassen et al. | |
| 2012/0051636 A1 | 3/2012 | Greenebaum et al. | |
| 2017/0359487 A1 | 12/2017 | Andersen | |
| 2019/0087671 A1* | 3/2019 | AlRegib | H04N 1/6008 |

* cited by examiner

*Primary Examiner* — Christopher M Brandt
(74) *Attorney, Agent, or Firm* — Norton Rose Fulbright US LLP; Gerard Messina

(57) ABSTRACT

A method includes obtaining, from an image sensor of a vehicle, an image signal that represents a vector of a plurality of input measured color values; determining weighting values as a function of the input measured values using a determination rule; ascertaining model matrices from a plurality of stored model matrices as a function of the weighting values, each of the model matrices generated for possible input measured values using a training rule; generating a color reconstruction matrix using the ascertained model matrices and at least one of the determined weighting values according to a generating rule; and applying the generated color reconstruction matrix to the measured color value vector in order to produce an output color vector that represents a processed image signal.

18 Claims, 3 Drawing Sheets

METHOD AND DEVICE FOR PROCESSING AN IMAGE SIGNAL OF AN IMAGE SENSOR FOR A VEHICLE

CROSS-REFERENCE TO RELATED APPLICATIONS

The present application claims priority under 35 U.S.C. § 119 to DE 10 2018 222 260.6 filed in the Federal Republic of Germany on Dec. 19, 2018, the content of which is hereby incorporated by reference herein in its entirety.

SUMMARY

To reconstruct color during processing of image sensor data, for example, a linear color correction matrix can be used, which can be applied to the acquired image data. According to example embodiments, in particular, uniform, nonlinear color reconstruction can be carried out. In this connection, nonlinear can mean, for example, that different methods of display are used, and, additionally or alternatively, a color space is subdivided nonlinearly, and an inverse calculation with a multiple matrix system can take place in a nonlinear manner. In other words, a nonlinear combination made up of linear partial tasks can be used for color reconstruction. In place of a conventional linear color correction matrix, the color reconstruction can become, for example, an optimization task or minimization task, which can be optimized for a nonlinear color reconstruction mode. To that end, a hardware resource can also be used, which can be optimized for such improved, nonlinear color reconstruction.

According to example embodiments, in particular, a color reconstruction for increasing the color reconstruction power or color reconstruction effectiveness can be rendered possible in an advantageous manner. For example, nonlinear color reconstruction including a plurality of color reconstruction matrices can be reformulated as an optimization problem, which can be advantageously solved by conventional methods. Consequently, in particular, a transformation of sensor data to a separate color space having specially adapted color resolution can be carried out, the color resolution being optimized for so-called computer vision. In this manner, a high resolution in a critical color combination of a monitored scene can be attained, in order to improve an evaluation of signals with regard to different lighting conditions, as well.

According to an example embodiment of the present invention, a method of processing an image signal of an image sensor for a vehicle includes: reading in the image signal from the image sensor, the image signal representing a measured color value vector having a plurality of input measured values; determining weighting values as a function of the input measured values, using a determination rule; ascertaining model matrices from a plurality of stored model matrices as a function of the weighting values; each of the model matrices being generated for possible input measured values, using a training rule; generating a color reconstruction matrix, using the ascertained model matrices and at least one of the determined weighting values, according to a generating rule; and applying the generated color reconstruction matrix to the measured color value vector, in order to generate an output color vector, which represents a processed image signal.

In this context, the above-mentioned method can be carried out individually for each measured color value vector.

This method can be implemented, for example, in the form of software or hardware or a mixture of software and hardware in, for example, a control unit or a device, in particular, as an integrated component of an image sensor having an integrated ISP. In particular, an implementation within a dedicated or integrated ISP (image signal processing) microchip can be carried out in a sensible manner. This can be integrated in the image sensor chip, in order to convert the measured color values into output color values directly after the measurement.

According to an example embodiment, in the reading-in step, an image signal can be read in that represents a measured color value vector that relates to a first color space. In this connection, in the applying step, an output color vector can be generated that relates to a second color space different from the first color space. In this connection, in the determining step, weighting values that represent a nonlinear subdivision of the first color space can also be determined. The first color space can be, for example, an image-sensor-specific color space of an RGB color pattern, or of an RCB or RCG color pattern, or an already preprocessed RGB color space or an xyz color space, according to the definition of the International Commission on Illumination (CIE=Commission Internationale de l'Éclairage). The second color space can be, for example, an RGB color space, an xyz color space, a YUV color space or an LUV color space, these color spaces being able to have an accuracy dependent on a color location. In this context, the description of the color spaces selected here, by way of example, is not to be understood as final; thus, the approach put forward here can also be implemented, using color spaces other than the ones mentioned here, without limiting the genericness. Such an example embodiment provides an advantage that a color reconstruction having a high reconstruction effectiveness, based on a given, first color space or input color space, can be achieved with regard to a desired, second color space or output color space, in view of particularly interesting regions of the input color space.

In the determination step, a weighting value and/or only one model matrix can also be determined for each input measured value. An advantage of such an example embodiment is that input measured values from interesting regions of the color space of the measured color value vector can be taken into account, in particular, by suitable weighting.

In addition, in the generating step, the color reconstruction matrix can be generated by assigning the ascertained model matrices to corresponding, determined weighting values in view of the input measured values. In this connection, ascertained model matrices can be re-sorted and intermixed in view of the weighting values. An association of a model matrix with a weighting value during the assigning can be determined in view of the input measured values. An advantage of such an example embodiment is that a color reconstruction matrix can be generated at a high resulting reconstruction efficiency, in an accurate and resource-conserving manner.

In addition, the method can include a step of generating the model matrices for possible input measured values, using the training rule. Such an example embodiment provides an advantage that the model matrices can be held in reserve as configuration data and updated by training. This allows computing power for executing the method to be reduced.

In this context, in the generating step, each of the model matrices can be generated for a separate, possible input measured value. In this connection, a position of the input measured value in a color space of the measured color value vector and, additionally or alternatively, a range of values of the input measured value, can be taken into account by a specific model matrix. An advantage of such an example embodiment is that in order to generate the color reconstruction matrix, model matrices can be provided, which also allow, in particular, interesting regions in a color space of the measured color value vector to be reconstructed in a reliable and accurate manner.

Also advantageous is an example embodiment in which, in the ascertaining step, the model matrices, whose assigned weighting value is not equal to zero, are ascertained. Such an example embodiment of the approach put forward here provides the advantage of an implementation option that is quite simple numerically or with regard to circuit engineering. In particular, in the case of nearest-neighborhood implementation, only one weighting value becomes unequal to zero, and in the case of linear interpolation in the 3-dimensional color space, only 8 weights become unequal to zero. In this manner, the entire input color space can always be mapped to the target color space by skillful selection of 8 matrices. When the selected matrices are fixed in a known manner, the ongoing processing can be optimized with regard to hardware.

According to an example embodiment, a device is configured to perform, control, and/or implement, in corresponding devices, the steps of a method as described herein. An object of the present invention can be achieved quickly and efficiently by this embodiment variant of the invention in the form of a device, as well.

To this end, the device can include at least one processing unit for processing signals or data, at least one storage unit for storing signals or data, at least one interface to a sensor or to an actuator for reading in sensor signals from the sensor or for outputting data signals or control signals to the actuator, and/or at least one communications interface for reading in or outputting data embedded in a communications protocol. The processing unit can be, for example, a signal processor, a microcontroller or the like; the storage unit being able to be a flash memory, an EEPROM or a magnetic storage unit. The communications interface can be configured to read in or output data wirelessly and/or in a line-conducted manner; a communications interface, which is able to read in or output the line-conducted data, being able to read in these data, e.g., electrically or optically, from a corresponding data transmission line, or to output them to a corresponding data transmission line.

In the case at hand, a device can be understood to be an electrical device that processes sensor signals and outputs control and/or data signals as a function of them. The device can include an interface that can be implemented as hardware and/or software. In a hardware design, the interfaces can, for example, be part of a so-called system ASIC that includes various functions of the device. However, it is also possible for the interfaces to be separate, integrated circuits or to be at least partially made up of discrete components. In a software design, the interfaces can be software modules that are present, for example, in a microcontroller, next to other software modules.

According to an example embodiment of the present invention, a sensor system for a vehicle includes: an image sensor for providing an image signal; and an example embodiment of the device mentioned above, the device and the image sensor being interconnected so as to be able to transmit data.

In the case of the sensor system, an example embodiment of the device mentioned above can be employed or used advantageously, in order to process the image signal of the image sensor.

According to an example embodiment of the preset invention, a computer program product or computer program includes program code that can be stored in a machine-readable carrier or storage medium, such as a solid state memory, a hard disk storage device, or an optical storage device and is used for performing, implementing, and/or controlling the steps of the method according to one of the example embodiments described herein, in particular, when the program product or program is executed on a computer or a device.

Example embodiments of the present invention are illustrated in the drawings and explained in greater detail in the following description.

DETAILED DESCRIPTION

Figure 1:
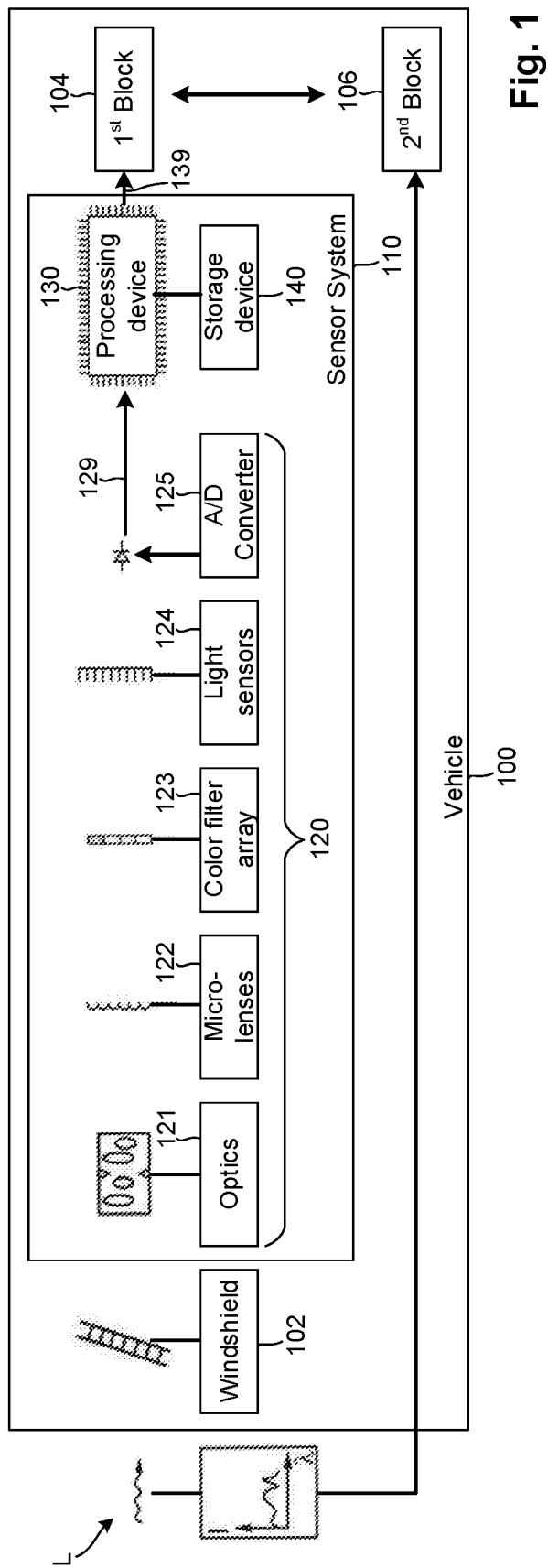
FIG. 1 is a schematic representation of a vehicle having a sensor system according to an example embodiment of the present invention.

In the following description of preferred example embodiments of the present invention, the same or similar reference numerals are used for the elements that are shown in the different figures and function similarly, in which case a repeated description of these elements is omitted.

FIG. 1 shows a schematic representation of a vehicle 100 having a sensor system 110 according to an example embodiment. Vehicle 100 is a motor vehicle, for example, a land vehicle, aircraft, or watercraft, in particular, a passenger car, cargo truck or another commercial vehicle. Light L having a spectrum symbolically illustrated here acts upon vehicle 100. A windshield 102 and sensor system 110 of vehicle 100 are shown in the representation of FIG. 1. In this connection, light L penetrates windshield 102 of vehicle 100, windshield 102 acting as a spectral filter.

Sensor system 110 includes an image sensor 120 or an image sensor device 120, and a device 130. Image sensor 120 is configured to provide an image signal 129. More specifically, image sensor 120 is configured to provide image signal 129 in response to, and as a function of, light L. Image signal 129 represents a measured color value vector $\vec{C}$ (color measurement vector) including a plurality of input measured values. The measured color value vector relates to a color space defined by image sensor 120. Device 130 is configured to process image signal 129. Image sensor 120 and device 130 are interconnected so as to be able to transmit data and/or signals. According to the example embodiment represented here, sensor system 110 also includes a storage device 140. Storage device 140 is connected to device 130 so as to be able to transmit data and/or signals.

According to the example embodiment represented here, image sensor 120 includes, by way of example, and listed in order from a side of image sensor 120 facing the windshield 102, optics 121, microlenses 122, a color filter array 123

(CFA), light sensors 124, and an analog-to-digital converter 125 (ADC). In this connection, optics 121, microlenses 122, and color filter array 123 each functions as a spectral filter for light L. Color filter array 123 resembles or corresponds to a color pattern mounted on or in front of light sensors 124. Light sensors 124 act as integrators with respect to a wavelength λ of light L. Analog-to-digital converter 125 acts as a quantizer.

Device 130 is configured to carry out image signal processing (ISP), including color reconstruction. In this context, device 130 is configured to generate an output color vector $\vec{H}$ (for example, either optimized for human vision or optimized for computer vision), using image signal 129 from image sensor 120, the output color vector representing a processed image signal 139. In the following, device 130 is discussed in even more detail.

In addition, for purposes of illustration, a first block 104 and a second block 106 are shown in FIG. 1. For example, first block 104 represents color values according to ISO 11664, in response to processed image signal 139. Second block 106 represents a direct reference value, for example, in the LUV color space (also ISO 11664), as well, based on a human observer, and in response to the light L outside of windshield 102. A comparison can be made between first block 104 and second block 106.

Figure 2:
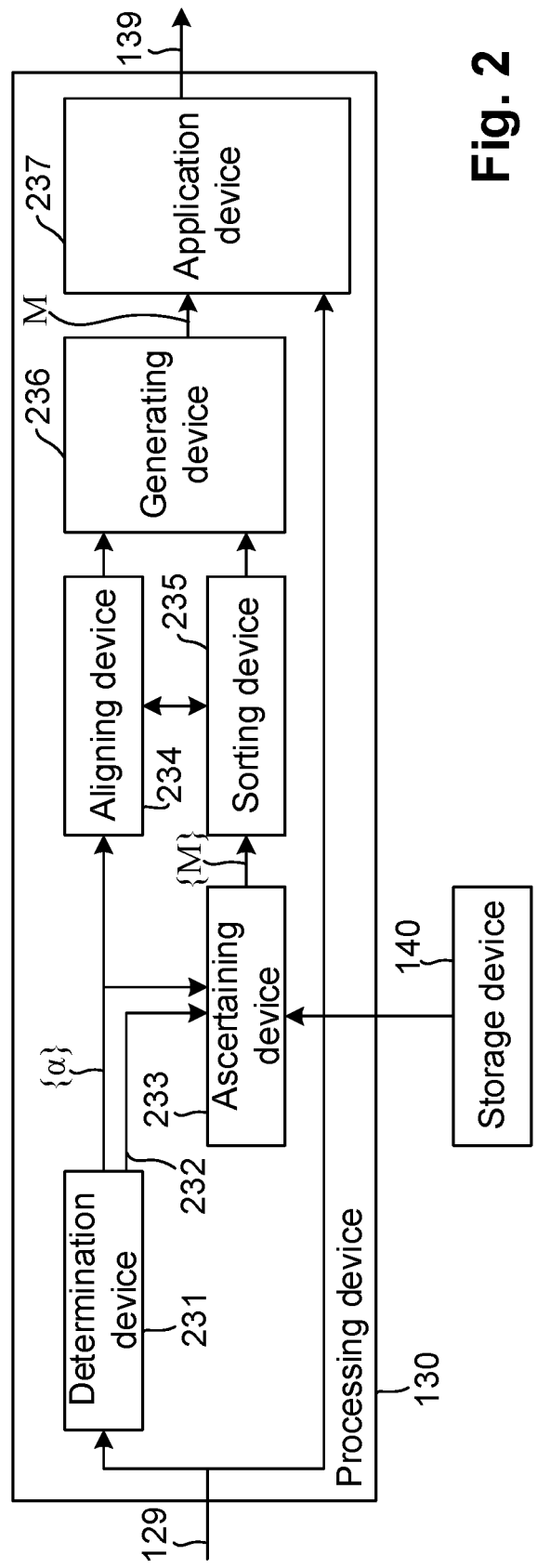
FIG. 2 is a schematic representation of the device of the sensor system from FIG. 1, according to an example embodiment of the present invention.

FIG. 2 shows a schematic representation of device 130 of the sensor system from FIG. 1. In addition, storage device 140 of the sensor system from FIG. 1 is shown in FIG. 2. Device 130 includes a determination device 231, an ascertaining device 233, a generating device 236, and an application device 237. According to the example embodiment represented here, device 130 also includes an aligning device 234 and a sorting device 235.

Device 130 is configured to read in image signal 129 from the image sensor. In particular, the image signal 129 read in represents a measured color value vector, which relates to a first color space. Determination device 231 is configured to determine weighting values {α} as a function of the input measured values represented by image signal 129, using a determination rule. Determination device 231 is advantageously configured to determine, for each input measured value, a weighting value for each of the stored model matrices in storage device 140. In particular, determination device 231 is configured to determine weighting values {α} that represent a nonlinear subdivision of the first color space. In addition, determination device 231 is configured to output the weighting values {α} determined, as well as a selection signal 232.

Ascertaining device 233 is configured to ascertain model matrices {M} from a plurality of stored model matrices as a function of weighting values {α}.

In this connection, ascertaining device 233 is configured to ascertain model matrices {M} in view of selection signal 232. In addition, ascertaining device 233 is configured to read in the model matrices from storage device 140. Each of the stored model matrices is generated for possible input measured values, using a training rule. Ascertaining device 233 is also configured to output ascertained model matrices {M}. Model matrices {M} are part of a mathematical model and are optimized with respect to input values, that is, adapted to specific positions of the individual input values. Model matrices {M} are split up as a function of the range of values and/or different scanning points. Ascertaining device 233 is advantageously configured in such a manner, that for a given color measurement vector 129, most of model matrices 140 do not need to be selected, and consequently, the amount of data downstream from ascertaining device 233 is kept low.

By cooperation, aligning device 234 and sorting device 235 are configured to sort ascertained model matrices {M} and to align sorted, ascertained model matrices {M} to the correct or corresponding, determined weighting values {α}. In other words, aligning device 234 and sorting device 235 are configured to compare ascertained model matrices {M} and determined weighting values {α} to each other and to produce an association between the same.

Generating device 236 is configured to generate a color reconstruction matrix M in accordance with a generating rule, using ascertained model matrices {M} and determined weighting values {α}. Generating device 236 is also configured to output color reconstruction matrix M. For each of the ascertained model matrices {M}, generating device 236 is configured to use an assigned value of the determined weighting values {α}. Consequently, a weighting for ascertained model matrices {M} is obtained as a function of measured values of the image sensor. In this connection, a dimension of color reconstruction matrix M is a function of measured color value vector $\vec{C}$ and output color vector $\vec{H}$. According to an example embodiment, aligning device 234 and sorting device 235 can be constructed as part of generating device 236.

Application device 237 is configured to apply the color reconstruction matrix M generated to measured color value vector $\vec{C}$, in order to generate output color vector $\vec{H}$, which represents processed image signal 139. In this connection, application device 237 is configured, in particular, to generate an output color vector $\vec{H}$ that relates to a second color space different from the first color space of measured color value vector C. In addition, application device 237 or device 130 is configured to output processed image signal 139 or to provide it for output. Colloquially, device 130 is run through once for each pixel of an entire image signal, thus, 2 million times in the case of a 2 megapixel image.

Figure 3:
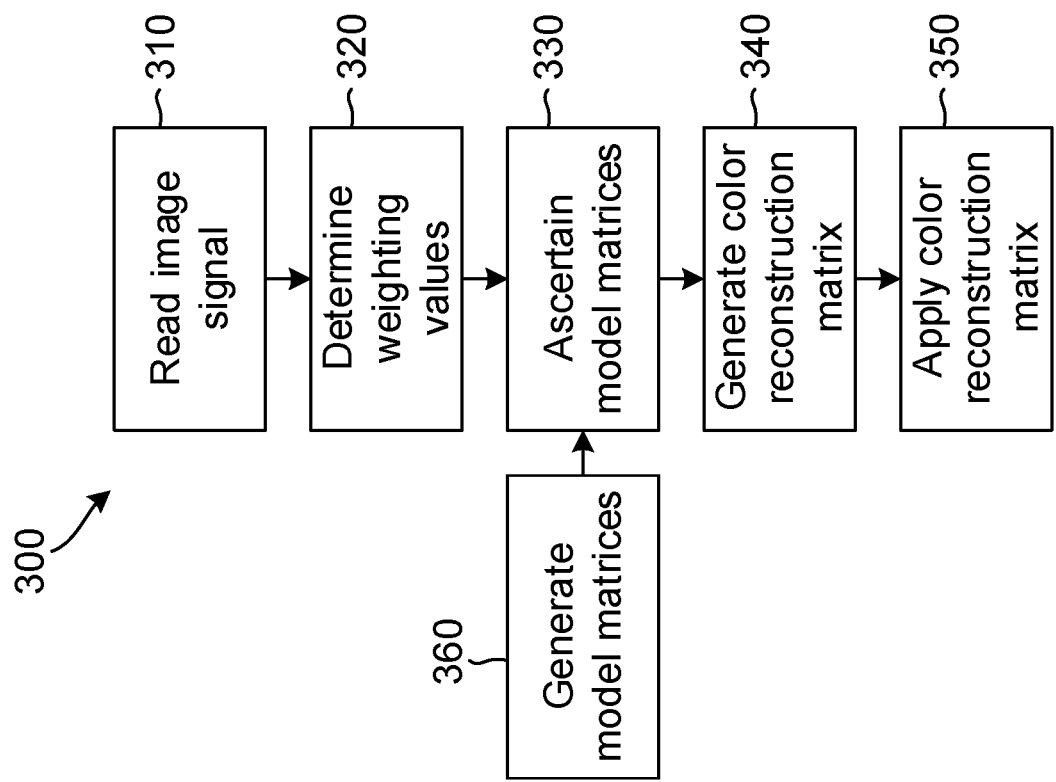
FIG. 3 is a flowchart of a method for processing according to an example embodiment of the present invention.

FIG. 3 is a flowchart of a method 300 for processing according to an example embodiment. Method 300 can be executed in order to process an image signal of an image sensor for a vehicle. In this context, method 300 is executable for processing in conjunction with and/or using the device from one of the figures described above. In addition, method 300 is executable for processing in conjunction with the sensor system from FIG. 1.

In a reading-in step 310 in processing method 300, the image signal of the image sensor of the sensor system is read in. The image signal represents a measured color value vector including a plurality of input measured values. In a determination step 320, weighting values are subsequently determined as a function of the input measured values, using a determination rule. In an ascertaining step 330, model matrices are ascertained from a plurality of stored model matrices as a function of the weighting values. In this context, each of the model matrices is generated for possible input measured values, using a training rule.

In a generating step 340, a color reconstruction matrix is subsequently generated in accordance with a generating rule, using the model matrices ascertained in ascertaining step 330 and at least one of the weighting values determined in determination step 320. In an application step 350, the color reconstruction matrix generated in generating step 340 is applied to the measured color value vector, in order to produce an output color vector that represents a processed image signal.

According to an example embodiment, processing method 300 also includes a step 360 of generating the model matrices for possible input measured values, using the training rule. In particular, in generating step 360, each of the model matrices is generated for a separate, possible input measured value.

With reference to the above-described figures, and in order to clarify example embodiments, in the following, backgrounds and bases of example embodiments are explained in general, in summary, in other words, and more specifically.

First, a definition of human perception of color is given. According to the International Commission on Illumination (CIE=Commission Internationale de l'Éclairage), human beings perceive color in a manner that is described mathematically by the XYZ color space of the CIE, that is, the CIE standard valency system. This is based on the physiological fact that human beings have three types of light sensors: for red, green and blue. The specifications of these perceptual units are used, in order to generate a weighted integral over the light output spectra, as follows:

$$X = \int_{380}^{780} L(\lambda) \bar{x}(\lambda) d\lambda \quad (1)$$

$$Y = \int_{380}^{780} L(\lambda) \bar{y}(\lambda) d\lambda \quad (2)$$

$$Z = \int_{380}^{780} L(\lambda) \bar{z}(\lambda) d\lambda \quad (3)$$

The functions $\bar{x}(\lambda)$, $\bar{y}(\lambda)$, $\bar{z}(\lambda)$ are defined in the standard ISO 11664-1, using sampling values having 5 nanometer intervals.

Human color perception can be summarized as follows:

$$\vec{H} = \begin{pmatrix} X \\ Y \\ Z \end{pmatrix} \quad (4)$$

Therefore, the sensitivity curves given in the standard can be reconstructed using the valid reconstruction function $\phi(\lambda)$.

$$\bar{x} = \Sigma_{\lambda_s \in sampling\ values} \bar{x}_{\lambda_s} \cdot \Phi(\lambda - \lambda_s) \quad (5)$$

$$\bar{y} = \Sigma_{\lambda_s \in sampling\ values} \bar{y}_{\lambda_s} \cdot \Phi(\lambda - \lambda_s)\ \bar{z} = \Sigma_{\lambda_s \in sampling\ values} \bar{z}_{\lambda_s} \cdot \Phi(\lambda - \lambda_s) \quad (6)$$

Assuming that the spectra are sampled at the same sampling points $\lambda_s$, the equations above can be simplified to:

$$X = \int_{380}^{780} \Sigma_{\lambda_s \in sampling\ values} L(\lambda_s) \cdot \Phi(\lambda - \|_s) \cdot \Sigma_{\lambda_s \in sampling\ values} \bar{x}_{\lambda_s} \cdot \Phi(\lambda - \lambda_s) \quad (7)$$

This is done analogously for Y and Z.

The characteristics of a reconstruction function are used, which are as follows:

$$\Phi(0) = 1 \quad (8)$$

$$\Phi(n \cdot x_s) = 0\ \forall n \neq 0\ x_s: sampling\ interval \quad (9)$$

$$\int \Phi(x) dx = 1 \quad (10)$$

And in simplified form:

$$X = \int_{380}^{780} \Sigma_{\lambda_s \in sampling\ values} L(\lambda_s) \cdot \Phi(\lambda - \lambda_s) \cdot \Sigma_{\lambda_s \in sampling\ values} \bar{x}_{\lambda_s} \cdot \Phi(\lambda - \lambda_s) d\lambda \quad (11)$$

$$= \int_{380}^{780} \Sigma_{\lambda_s \in sampling\ values} L(\lambda_s) \cdot \bar{x}_{\lambda_s} \cdot \Phi(\lambda - \lambda_s) d\lambda \quad (12)$$

$$= \Sigma_{\lambda_s \in sampling\ values} L(\lambda_s) \cdot \bar{x}_{\lambda_s} \cdot \underbrace{\int_{380}^{780} \Sigma_{\lambda_s \in sampling\ values} \Phi(\lambda - \lambda_s) d\lambda}_{=1\ or\ \approx 1} \quad (13)$$

$$= \Sigma_{\lambda_s \in sampling\ values} L(\lambda_s) \cdot \bar{x}_{\lambda_s} \quad (14)$$

Now, a definition of the color approximation, using color filter array sampling or CFA sampling, is provided. Each color image sensor attempts to imitate human behavior. That is why at least three partially independent color perception channels are installed in each color filter array. With knowledge of the color transmission curves of the CFA, the CFA response values can be extracted, using the above-mentioned mathematical expressions. This yields:

$$CFA_1 = \int_{380}^{780} L(\lambda) \overline{CFA}_1(\lambda) d\lambda \quad (15)$$

$$CFA_2 = \int_{380}^{780} L(\lambda) \overline{CFA}_2(\lambda) d\lambda \quad (16)$$

$$CFA_3 = \int_{380}^{780} L(\lambda) \overline{CFA}_3(\lambda) d\lambda \quad (17)$$

And, for example, for an RCG color sensor:

$$CFA_1 = R \quad (18)$$

$$CFA_2 = C \quad (19)$$

$$CFA_3 = G \quad (20)$$

The color sensation observed using a camera can be summarized as:

$$\vec{C} = \begin{pmatrix} R \\ C \\ B \end{pmatrix} \quad (21)$$

The following is a more detailed explanation of the color correction matrix. Since it is normally assumed that the camera color is close to the color perceived by people, it is assumed that the color reconstruction can be accomplished by a linear function (the initial chromatic aberration is assumed to be small):

$$\vec{H}_{3 \times 1} = M_{3 \times 3} \cdot \vec{C}_{3 \times 1} + \vec{O}_{3 \times 1} \quad (22)$$

$$\vec{H}_{3 \times 1} = M_{3 \times 3} \cdot \vec{C}_{3 \times 1} \quad (23)$$

$\vec{O}$ is an offset correction and is usually not necessary.

Assuming that out of a given number of light spectra, a number of at least N pairs of $\vec{H}$ and $\vec{C}$ is available, the color reconstruction problem can be formulated as follows:

$$(\vec{H}_1 \ldots \vec{H}_N)_{3 \times N} = M_{3 \times 3} \cdot (\vec{C}_1 \ldots \vec{C}_N)_{3 \times N} \quad (24)$$

In the following, what was presented above is formulated as a minimization problem. Assuming that $M_{3 \times 3}$ is known, but that the quantity $\{\vec{H}, \vec{C}\}$ is unknown, the M that is the best fit can be found by rewriting the problem as a known minimization problem. First, $$(\vec{H}_1 \ldots \vec{H}_N)_{3 \times N} = M_{3 \times 3} \cdot (\vec{C}_1 \ldots \vec{C}_N)_{3 \times N} \quad (25)$$

is split up into three equations:

$$(X_1 \ldots X_N)_{1 \times N} = M_{X, 1 \times 3} \cdot (\vec{C}_1 \ldots \vec{C}_N)_{3 \times N} \quad (26)$$

$$(Y_1 \ldots Y_N)_{1 \times N} = M_{Y, 1 \times 3} \cdot (\vec{C}_1 \ldots \vec{C}_N)_{3 \times N} \quad (27)$$

$$(Z_1 \ldots Z_N)_{1 \times N} = M_{Z, 1 \times 3} \cdot (\vec{C}_1 \ldots \vec{C}_N)_{3 \times N} \quad (28)$$

where each of the equations can also be written as follows:

$$(X_1 \ldots X_N)_{N \times 1}^T = \begin{pmatrix} \vec{C}_1^T \\ \vdots \\ \vec{C}_N^T \end{pmatrix}_{N \times 3} \cdot M_{X, 3 \times 1}^T \quad (29)$$

$$(Y_1 \ldots Y_N)_{N \times 1}^T = \ldots \quad (30)$$

$$\ldots \quad (31)$$

In shorter notation:

$$\vec{H}_X = (X_1 \ldots X_N)_{N \times 1}^T \quad (32)$$

$$\vec{H}_Y = (X_1 \ldots X_N)_{N \times 1}^T \quad (33)$$

$$\vec{H}_Z = (X_1 \ldots X_N)_{N \times 1}^T \quad (34)$$

And in the same manner for the sub-matrices M:

$$\vec{M}_X = M_{X, 3 \times 1}^T \quad (35)$$

$$\vec{M}_Y = M_{Y, 3 \times 1}^T \quad (36)$$

$$\vec{M}_Z = M_{Z, 3 \times 1}^T \quad (37)$$

Finally, for the measurements:

$$\underline{C} = \begin{pmatrix} \vec{C}_1^T \\ \vdots \\ \vec{C}_N^T \end{pmatrix} \quad (38)$$

Equations (26) through (28) can be rewritten as:

$$\underline{C} \cdot \vec{M}_X = \vec{H}_X \quad (39)$$

$$\underline{C} \cdot \vec{M}_Y = \vec{H}_Y \quad (40)$$

$$\underline{C} \cdot \vec{M}_Z = \vec{Z}_Z \quad (41)$$

These three equations can be combined into one again, by concatenating the vectors, and by repeating the matrix $\underline{C}$:

$$\begin{pmatrix} \underline{C} & 0 & 0 \\ 0 & \underline{C} & 0 \\ 0 & 0 & \underline{C} \end{pmatrix}_{3N \times 9} \cdot \begin{pmatrix} \vec{M}_X \\ \vec{M}_Y \\ \vec{M}_Z \end{pmatrix}_{9 \times 1} = \begin{pmatrix} \vec{H}_X \\ \vec{H}_Y \\ \vec{H}_Z \end{pmatrix}_{3N \times 1} \quad (42)$$

$$\Leftrightarrow A \cdot x = b \quad (43)$$

To minimize this equation, for example, in terms of the least squares error in x, the known method of least squares and a minimization solution method, such as the method of conjugate gradients, can be used.

$$\arg \min_x \|Ax = b\|^2 \quad (44)$$

$$\Leftrightarrow \arg \min_x A^t A x = A^t b \quad (45)$$

If these terms are expanded, further simplifications are yielded, and it is discernible how matrix A can be calculated from the color measurements.

In the following, the use of a plurality of color correction matrices is discussed. Assuming a color filter array having $N_C$ channels, each sensor generates a digital number $DN \in [DN_{min} \ldots DN_{max}]$. In the case of current HDR sensors: $DN_{min} = 0$ and $DN_{max} = 2^{24}$. For each individual measurement $\vec{C}$, there exists a matrix $M(\vec{C})$, which allows human observation to be reconstructed. There is a compromise in metamers of the type, in which a human observer distinguishes two colors, for which the machine only has one observation (for example, due to quantification effects).

$$\vec{H} = M(\vec{C}) \cdot \vec{C} \quad (46)$$

Such an approach requires special storage space. The current approach is to sample $M(\vec{C})$ with regard to $\vec{C}$ and to reconstruct it, as it is described above (equation 5):

$$\vec{H} = \Sigma_i (M(\vec{C}_i) \cdot \Phi(\vec{C}_i - \vec{C})) \cdot \vec{C} \quad (47)$$

Using equidistant sampling at the positions $S = \{0, \frac{1}{2} DN_{max}, DN_{max}\}$, and assuming $N_C = 3$ color channels, the total number of color correction matrices is obtained:

$$p_{max} = |S|^{N_C} \quad (48)$$

$$= 3^3 = 27 \quad (49)$$

Regarding the reconstruction function phi or $\phi$, the following property can be emphasized:

$$\Phi: \mathcal{R}^3 \to \mathcal{R} \quad (50)$$

In addition, $\phi$ is divisible and identical, which results from the fact that the sampling function itself is divisible and identical for each dimension:

$$\Phi = \Pi_{i \in \{1 \ldots N_C\}} \Phi_i(\bullet) \quad (51)$$

e.g., for $RCCG = \Phi_R(\bullet) \cdot \Phi_C(\bullet) \cdot \Phi_G(\bullet) \quad (52)$ It can be used for $\phi$, a linear interpolation.

$$D = \frac{1}{2} DN_{max} \quad (53)$$

$$\Phi(x) = tri(x) = \begin{cases} 0, & x < -D \\ 1 - \left|\frac{x}{D}\right|, & x \in [-D, D] \\ 0, & x > D \end{cases} \quad (54)$$

Alternatively, $\phi = rect( )$ can be used, and an interpolation of nearest neighbors can be obtained, which, with regard to hardware expenditure, can be more effective computationally.

$$D = \frac{1}{2}DN_{max} \tag{55}$$

$$\Phi(x) = rect(x) = \begin{cases} 0, & x < -\frac{1}{2}D \\ 1, & x \in \left[-\frac{1}{2}D, \frac{1}{2}D\right] \\ 0, & x > \frac{1}{2}D \end{cases} \tag{56}$$

With regard to implementation, the color reconstruction can be simplified to:

$$\vec{H} = \sum_{p}\left(M(\vec{C}_p) \cdot \underbrace{\Pi_i \Phi_i(S(i) - C(i))}_{\alpha_p(\vec{C})}\right) \cdot \vec{C} \tag{57}$$

In the case of a CFA having three channels and three sampling points of the color correction matrix, the transformations are:

$$S(1) = 0 \tag{58}$$

$$S(2) = D = \tfrac{1}{2}DN_{max} \tag{59}$$

$$S(3) = 2D = DN_{max} \tag{60}$$

$$C(1) = R(\text{pix}) \tag{61}$$

$$C(2) = C(\text{pix}) \tag{62}$$

$$C(3) = G(\text{pix}) \tag{63}$$

This means that there are a number of $\alpha_p(\vec{C})$ values, but that most of the $\alpha$ values are 0:

$$\vec{H} = \sum_{\alpha_p \neq 0}\left(\alpha_p(\vec{C})M(\vec{C}_p)\right) \cdot \vec{C} \tag{64}$$

$$= \sum_{\alpha_p \neq 0}\left(\alpha_p(\vec{C})M(\vec{C}_p)\right) \cdot \vec{C} \tag{65}$$

$$\Sigma_{\alpha_p \neq 0} = 1 \quad \Phi = \text{rect( ) interpolation of nearest neighbors} \tag{66}$$

$$\Sigma_{\alpha_p \neq 0} = 8 \quad \Phi = \text{tri( ) (tri)linear interpolation} \tag{67}$$

Depending on the selection of $\phi$, any other situations in which values of $\alpha$ are other than zero are possible.

It should be mentioned that $\alpha_p(\vec{C})$ is a function of $\vec{C}$ and therefore is to be calculated for each occurring pixel in the color reconstruction operation.

In the above examples, either one or eight matrices are computed as a function of computing capacity and hardware resources, in order to carry out the color reconstruction. The other matrices become zero, $C_{\blacksquare_p} = 0$, since $\alpha_p = 0$ for these.

Regarding the ascertainment of the matrix values, it is mentioned once more that there is a known number of pairs $\{\vec{H}, \vec{C}\}$. In addition, it is assumed that the sampling positions for the M are known, which allows the $\alpha$ values to be calculated for each $\vec{C}$ in accordance with equation 57.

$$\vec{H} = \sum_{\alpha_p \neq 0}\left(\alpha_p(\vec{C})M(\vec{C}_p) \cdot \vec{C}\right) \tag{68}$$

$$= \sum_{\alpha_p \neq 0}\left(M(\vec{C}_p) \cdot \alpha_p(\vec{C})\vec{C}\right) \tag{69}$$

$$= \sum_{\alpha_p \neq 0}\left(M_p \cdot \vec{C}_{\alpha_p}\right) \tag{70}$$

In the last step, only a shorter notation has been introduced.

Introducing N known pairs of $\{\vec{H}, \vec{C}\}$ measurements yields:

$$(\vec{H}_1, \ldots, \vec{H}_M) = \Sigma_{\alpha_p = 0}[M_p \cdot (\vec{C}_{\alpha_p,1}, \ldots, \vec{C}_{\alpha_p,1})] \tag{71}$$

Introducing the matrix of weighted color measurements yields:

$$\underline{C_{\alpha_p}} = \alpha_p \begin{pmatrix} \vec{C}_1^T \\ \vdots \\ \vec{C}_N^T \end{pmatrix} = \begin{pmatrix} \alpha_p \vec{C}_1^T \\ \vdots \\ \alpha_p \vec{C}_N^T \end{pmatrix} = \begin{pmatrix} \vec{C}_{\alpha_p,1}^T \\ \vdots \\ \vec{C}_{\alpha_p,N}^T \end{pmatrix} \tag{72}$$

And after splitting up the formulas into the components of $\vec{H}$, the result is:

$$\vec{H}_X{}^t = \Sigma_{\alpha_p = 0}(M_{p,X}{}^t \cdot C_{\alpha_p}{}^t) \tag{73}$$

$$\vec{H}_Y{}^t = \Sigma_{\alpha_p = 0}(M_{p,Y}{}^t \cdot C_{\alpha_p}{}^t) \tag{74}$$

$$\vec{H}_Z{}^t = \Sigma_{\alpha_p = 0}(M_{p,Z}{}^t \cdot C_{\alpha_p}{}^t) \tag{75}$$

Using the transformation rule of matrices yields:

$$\vec{H}_X = \Sigma_{\alpha_p = 0}(C_{\alpha_p} \cdot M_{p,X}) \tag{76}$$

$$\vec{H}_Y = \Sigma_{\alpha_p = 0}(C_{\alpha_p} \cdot M_{p,Y}) \tag{77}$$

$$\vec{H}_Z = \Sigma_{\alpha_p = 0}(C_{\alpha_p} \cdot M_{p,Z}) \tag{78}$$

Combined, the following system of equations is formed:

$$\begin{pmatrix} \underline{C_{\alpha_1}} & \cdots & \underline{C_{\alpha_{pmax}}} & 0 & 0 & 0 & 0 & 0 & 0 \\ 0 & 0 & 0 & \underline{C_{\alpha_1}} & \cdots & \underline{C_{\alpha_{pmax}}} & 0 & 0 & 0 \\ 0 & 0 & 0 & 0 & 0 & 0 & \underline{C_{\alpha_1}} & \cdots & \underline{C_{\alpha_{pmax}}} \end{pmatrix}_{3N \times 3 \cdot N_C \cdot p_{max}} \cdot \begin{pmatrix} \vec{M}_{1,X} \\ \vdots \\ \vec{M}_{p_{max},X} \\ \vec{M}_{1,Z} \\ \vdots \\ \vec{M}_{p_{max},Y} \\ \vec{M}_{1,Z} \\ \vdots \\ \vec{M}_{p_{max},Z} \end{pmatrix}_{3 \cdot N_C \cdot p_{max} \times 1} = \begin{pmatrix} \vec{H}_X \\ \vec{H}_Y \\ \vec{H}_Z \end{pmatrix}_{3 \cdot N \times 1} \tag{79}$$

For the case of NC=3 color channels and $\|\mathcal{S}\|=3$ sampling points per CFA channel, the following matrices are obtained for training N color spectra:

$$p_{max}=27 \tag{80}$$

$$A_{3N\times 3N_C p_{max}} \cdot x_{N_C p_{max}\times 1} = b_{3N\times 1} \tag{81}$$

$$A_{3N\times 243} \cdot x_{243\times 1} = b_{3N\times 1} \tag{82}$$

Assuming minimization according to the method of least squares, the specific numbers result in this example:

$$A_{243\times 3N}{}^t A_{3n\times 243} \cdot x_{243\times 1} = A_{243\times 3N}{}^t b_{3N\times 1} B_{243\times 243} \cdot x_{243\times 1} = c_{243\times 1} \tag{83}$$

The first step is a large matrix multiplication, in particular, for the case in which N is large. For example, $N=5\cdot 10^4$ spectral values are to be optimized, which results in, for this calculation, a storage requirement of approximately 2·300 megabytes. This calculation can be performed offline in an efficient manner on a typical PC having MATLAB or Python installed, since it fits in the RAM.

The second step is a matrix optimization of a resulting matrix having a size of approximately 243×243·32 bit≈1 megabyte for the optimization problem. This is also simple to handle, using a standard PC.

Different values for the individual $\vec{C}$'s are produced as a function of the selection of the initial color filter arrays, which generate the $\{\vec{C}\}$ measurements. The result of this can be that either more sampling points $M_p$ have to be introduced, and therefore, more matrices have to be generated, from which it can be chosen when the color is reconstructed; or that the position of the sampling points of the model matrices is to be changed, and therefore, in the case of each new, computed $C_{\alpha_p}$, more storage space is to be used as a function of the new selection of scanning positions $M_p$ and/or of the adapted selection of $\phi$.

Optimization problems are normally calculated with floating point precision. However, since the final product is most likely computed in fixed point iterations, the entire optimization operation can also be used directly as a fixed point iteration. Thus, a loss in precision can be prevented if the ascertained values of the matrices are used, and it can be discerned how much fixed point precision is needed in order to obtain the desired result.

In the case of color reconstruction hardware having the nonlinear characteristics described above, the hardware requirements could sometimes be overly high. For trilinear color interpolation between the 8 nearest matrices $M_p$, there should be 8 parallel color correction matrices. However, in the case of the calculation of nearest neighbors, there is, by definition, only one color correction matrix, which should be ascertained for each occurring pixel. The latter is a standard problem, and this should be able to be solved highly efficiently by conventional methods of hardware logic generation.

Therefore, for the case in which trilinear reconstruction is out of the question, it is proposed that the approach of nearest neighbors be used and the linear transformation be compensated for by introducing more than 27 sampling points for $M_p$.

However, for each received color value to be reconstructed, the $\alpha$ value of this color should be calculated. In the case of trilinear reconstruction, $\alpha$ will lie in the range of [0, 1], whereas it will only be either 0 or 1 for the nearest neighbors.

The computing device for calculating the $\alpha$ values can be optimized with regard to speed, power, and gate number. It is estimated that using $p_{max}=128$ matrices $M_p$, and reconstruction utilizing nearest neighbors, sufficiently effective results can be attained; with trilinear interpolation, even excellent quality of results can be obtained.

The method according to example embodiments can also be applied to reconstruction of other color spaces and color palettes. It has been assumed that human color perception is reproduced in the XYZ color space; however, using different color spaces and, in particular, color spaces having a separate chromaticity level, the human chromaticity impression is aksi able to be defined only by the chromaticity level. For the LUV color space of the CIE, this yields:

$$\vec{H} = \begin{pmatrix} u \\ v \end{pmatrix} \tag{84}$$

This can be used in the explanations above, in order to obtain the target color space directly in the following manner:

$$\begin{pmatrix} C_{\alpha_1} & \cdots & C_{\alpha_{pmax}} & 0 & 0 & 0 & 0 & 0 & 0 \\ 0 & 0 & 0 & C_{\alpha_1} & \cdots & C_{\alpha_{pmax}} & 0 & 0 & 0 \\ 0 & 0 & 0 & 0 & 0 & 0 & C_{\alpha_1} & \cdots & C_{\alpha_{pmax}} \end{pmatrix}_{2N\times 2\cdot N_C\cdot p_{max}} \cdot \begin{pmatrix} \vec{M}_{1,u} \\ \vdots \\ \vec{M}_{p_{max},u} \\ \vec{M}_{1,v} \\ \vdots \\ \vec{M}_{p_{max},v} \end{pmatrix}_{2\cdot N_C\cdot p_{max}\times 1} = \begin{pmatrix} \vec{H}_u \\ \vec{H}_v \end{pmatrix}_{2\cdot N\times 1} \tag{85}$$

This allows the matrices to contract and renders possible a more rapid search for the correct sampling points and the number of sampling points. The matrix state can be improved by adding more sampling points, or by changing the position of the sampling points.

If an example embodiment includes an "and/or" conjunction between a first feature and a second feature, then this is to be read such that, according to an example embodiment, the example embodiment includes both the first feature and the second feature, and according to another example embodiment, the example embodiment includes either only the first feature or only the second feature.

What is claimed is:

1. A method for use with a vehicle, the method comprising:
    obtaining, from an image sensor of the vehicle, an image signal representing a measured color value vector having a plurality of input measured values;
    determining, via a determination device, in accordance with a determination rule, weighting values based on the input measured values;
    ascertaining, via an ascertaining device, based on the weighting values, model matrices from a plurality of stored model matrices that each is generated for possible input measured values in accordance with a training rule;
    generating, in accordance with a generating rule, a color reconstruction matrix based on the ascertained model matrices and the corresponding determined weighting values;
    applying the generated color reconstruction matrix to the measured color value vector, so as to provide an output color vector that represents a processed color image signal;
    wherein an aligning device and a sorting device are configured to sort ascertained model matrices and to align sorted, ascertained model matrices to corresponding ones of determined weighting values, so that the aligning device and the sorting device are configured to compare the ascertained model matrices and the determined weighting values to each other and to produce an association therebetween, and
    wherein the determination device is configured to output the weighting values and a selection signal for the ascertaining of the model matrices by selection, and wherein for a given color measurement vector, at least a majority of the model matrices need not be selected, so that an amount of data downstream from the ascertaining device is reduced.

2. The method of claim 1, wherein the measured color value vector relates to a first color space wherein the weighting values represent a nonlinear subdivision of the first color space and wherein the output color vector relates to a second color space different from the first color space.

3. The method of claim 1, wherein the determining of weighting values includes determining only one weighting value and/or only one model matrix for each input measured value.

4. The method of claim 1, wherein the generating of the color reconstruction matrix is performed by assigning the ascertained model matrices to corresponding, determined weighting values in view of the input measured values.

5. The method of claim 1, further comprising:
    generating, in accordance with the training rule, the stored model matrices for possible input measured values.

6. The method of claim 5, wherein the generated stored model matrices correspond to different respective ones of the possible input measured values.

7. The method of claim 1, wherein the ascertained model matrices are ascertained based on a correspondence of the respective matrix to a respective one of the weighting values that is not equal to zero.

8. The method of claim 1, wherein the image sensor includes optics, microlenses, a color filter array (CFA), light sensors, and an analog-to-digital converter (ADC).

9. The method of claim 8, wherein the optics, the microlenses, and the color filter array each functions as a spectral filter for light L, wherein the color filter array corresponds to a color pattern mounted on or in front of the light sensors, wherein the light sensors function as integrators with respect to a wavelength $\lambda$ of the light L, and wherein the analog-to-digital converter functions as a quantizer.

10. A device for use with a vehicle, comprising:
    a processor configured to perform the following:
        obtaining, from an image sensor of the vehicle, an image signal representing a measured color value vector having a plurality of input measured values;
        determining, via a determination device, in accordance with a determination rule, weighting values based on the input measured values;
        ascertaining, via an ascertaining device, based on the weighting values, model matrices from a plurality of stored model matrices that each is generated for possible input measured values in accordance with a training rule;
        generating, in accordance with a generating rule, a color reconstruction matrix based on the ascertained model matrices and the corresponding determined weighting values; and
        applying the generated color reconstruction matrix to the measured color value vector, so as to provide an output color vector that represents a processed color image signal;
        wherein an aligning device and a sorting device are configured to sort ascertained model matrices and to align sorted, ascertained model matrices to corresponding ones of determined weighting values, so that the aligning device and the sorting device are configured to compare the ascertained model matrices and the determined weighting values to each other and to produce an association therebetween, and
        wherein the determination device is configured to output the weighting values and a selection signal for the ascertaining of the model matrices by selection, and wherein for a given color measurement vector, at least a majority of the model matrices need not be selected, so that an amount of data downstream from the ascertaining device is reduced.

11. The device of claim 10, wherein the image sensor includes optics, microlenses, a color filter array (CFA), light sensors, and an analog-to-digital converter (ADC).

12. The device of claim 11, wherein the optics, the microlenses, and the color filter array each functions as a spectral filter for light L, wherein the color filter array corresponds to a color pattern mounted on or in front of the light sensors, wherein the light sensors function as integrators with respect to a wavelength $\lambda$ of the light L, and wherein the analog-to-digital converter functions as a quantizer.

13. A sensor system for use with a vehicle, comprising:
an image sensor for the vehicle; and
a device having a processor configured to perform the following:
obtaining, from the image sensor, an image signal representing a measured color value vector having a plurality of input measured values;
determining, via a determination device, in accordance with a determination rule, weighting values based on the input measured values;
ascertaining, via an ascertaining device, based on the weighting values, model matrices from a plurality of stored model matrices that each is generated for possible input measured values in accordance with a training rule;
generating, in accordance with a generating rule, a color reconstruction matrix based on the ascertained model matrices and the corresponding determined weighting values; and
applying the generated color reconstruction matrix to the measured color value vector, so as to provide an output color vector that represents a processed color image signal;
wherein an aligning device and a sorting device are configured to sort ascertained model matrices and to align sorted, ascertained model matrices to corresponding ones of determined weighting values, so that the aligning device and the sorting device are configured to compare the ascertained model matrices and the determined weighting values to each other and to produce an association therebetween, and
wherein the determination device is configured to output the weighting values and a selection signal for the ascertaining of the model matrices by selection, and wherein for a given color measurement vector, at least a majority of the model matrices need not be selected, so that an amount of data downstream from the ascertaining device is reduced.

14. The sensor system of claim 13, wherein the image sensor includes optics, microlenses, a color filter array (CFA), light sensors, and an analog-to-digital converter (ADC).

15. The sensor system of claim 14, wherein the optics, the microlenses, and the color filter array each functions as a spectral filter for light L, wherein the color filter array corresponds to a color pattern mounted on or in front of the light sensors, wherein the light sensors function as integrators with respect to a wavelength $\lambda$ of the light L, and wherein the analog-to-digital converter functions as a quantizer.

16. A non-transitory computer-readable medium, on which are stored instructions, which are executable by a processor, comprising:
a program code arrangement having program code, which is for use with a vehicle, for performing the following:
obtaining, from an image sensor of the vehicle, an image signal representing a measured color value vector having a plurality of input measured values;
determining, via a determination device, in accordance with a determination rule, weighting values based on the input measured values;
ascertaining, via an ascertaining device, based on the weighting values, model matrices from a plurality of stored model matrices that each is generated for possible input measured values in accordance with a training rule;
generating, in accordance with a generating rule, a color reconstruction matrix based on the ascertained model matrices and the corresponding determined weighting values; and
applying the generated color reconstruction matrix to the measured color value vector, so as to provide an output color vector that represents a processed color image signal;
wherein an aligning device and a sorting device are configured to sort ascertained model matrices and to align sorted, ascertained model matrices to corresponding ones of determined weighting values, so that the aligning device and the sorting device are configured to compare the ascertained model matrices and the determined weighting values to each other and to produce an association therebetween, and
wherein the determination device is configured to output the weighting values and a selection signal for the ascertaining of the model matrices by selection, and wherein for a given color measurement vector, at least a majority of the model matrices need not be selected, so that an amount of data downstream from the ascertaining device is reduced.

17. The computer-readable medium of claim 16, wherein the image sensor includes optics, microlenses, a color filter array (CFA), light sensors, and an analog-to-digital converter (ADC).

18. The computer-readable medium of claim 17, wherein the optics, the microlenses, and the color filter array each functions as a spectral filter for light L, wherein the color filter array corresponds to a color pattern mounted on or in front of the light sensors, wherein the light sensors function as integrators with respect to a wavelength $\lambda$ of the light L, and wherein the analog-to-digital converter functions as a quantizer.

* * * * *